Nov. 7, 1950 C. E. HENDRICKS 2,528,885
AUTOMATIC VOLUME CONTROL CIRCUIT
Filed July 3, 1948
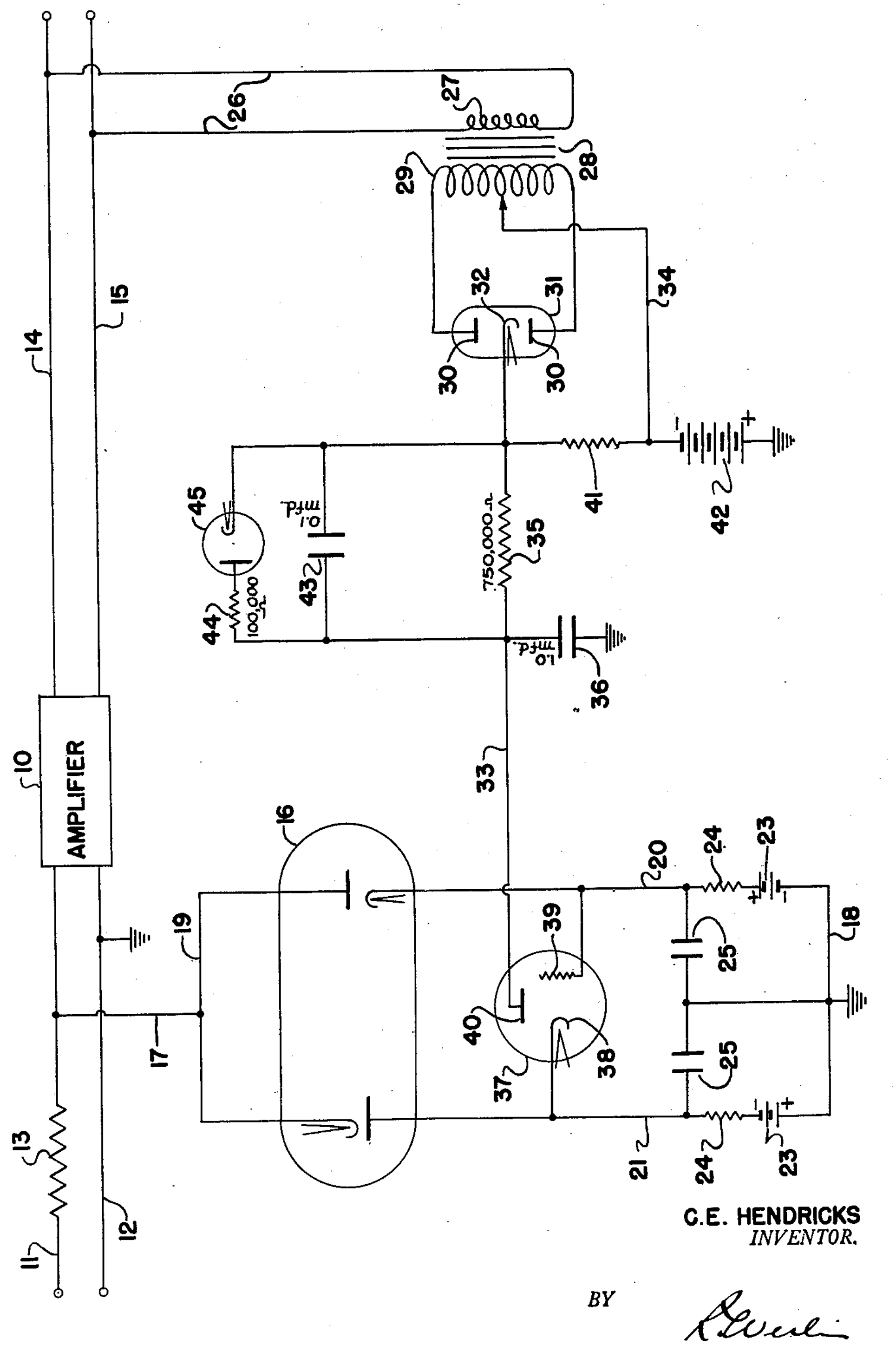
C.E. HENDRICKS
*INVENTOR.*
*BY*
ATTORNEY Patented Nov. 7, 1950 2,528,885

UNITED STATES PATENT OFFICE 2,528,885

AUTOMATIC VOLUME CONTROL CIRCUIT

Charles E. Hendricks, Tulsa, Okla., assignor to Century Geophysical Corporation, a corporation of Delaware Application July 3, 1948, Serial No. 36,851

8 Claims. (Cl. 179—171)

My invention relates to improvements in seismograph amplifiers, and more particularly to the automatic volume-control circuit therefor.

Various gain-control circuits have heretofore been devised for use with seismograph amplifiers to automatically control the gain, and examples of these are shown in Patent No. 2,383,571 issued Aug. 28, 1945 to E. M. Shook; and Patent No. 2,384,393 issued Sept. 4, 1945 to J. O. Parr, Jr. While these have proven useful, none have been completely effective for their intended purpose largely because of the several conflicting requirements of a truly automatic system. For example, one of the most important and difficult problems encountered in connection with the design of an effective automatic gain-control circuit, is that found in connection with the time delay or "operate time" of the amplifier and the recovery rate or "deoperate time" requirements. It is obvious that the operate rate must respond very fast in order that the output of the amplifier may be adjusted to produce a record of legible amplitude on the seismogram. If this does not occur the early portions of the seismogram will be lost, consequently accurate computing or mapping of the shallow formations would not be possible. Therefore, it is evident that for this condition concerning the beginning of the seismogram, the sooner the operate function takes place the better or the more useable the record to be had. However, to preserve the fidelity of the reflections to be recorded, the operate time must also be relatively slow. Otherwise the character of the reflected waves will be so altered that interpretation is not possible without chances for additional serious errors. Other requirements of a fully automatic gain-control circuit are adequate variation in the extent of the control to correspond with normal decay in energy of the signals coming from successively deeper beds; ability to maintain constant operate and deoperate time throughout the making of the record and irrespective of the changing average level of signal intensity; and effective filtering of the portion of the output voltage which is conventionally rectified and employed in the gain-control circuit in order to effectively remove or smooth out the ripple component normally present in the rectified voltage. It is also important that the audio power necessary to actuate the gain-control system should not be greater than the power requirements of the recording apparatus driven by the amplifier.

Accordingly, a primary object of this invention is to provide an improved automatic gain-control circuit for seismograph amplifiers which will meet the several important requirements noted above.

An important object is the provision of an improved gain-control circuit, wherein the operate-deoperate times are independent of the average signal level and wherein the operate and deoperate time constants may be sufficiently isolated from each other so that separate adjustments of the operate and deoperate functions may be effected automatically and in accordance with the requirements of the system.

Other and more specific objects and advantages of this invention will become apparent from the following detailed description when read in conjunction with the accompanying drawing, showing a simplified circuit diagram illustrative of a gain-control circuit constructed and operating in accordance with my invention.

Referring to the drawing, an amplifier 10, which may be of any of the conventional types, magnifies the signals received from conventional geophones (not shown) through a pair of input leads 11 and 12, one of which has the usual resistor 13 interposed therein. Amplifier 10 is provided with the usual output leads 14 and 15 for transmitting the amplified signals to a seismic recorder (not shown) which, it will be understood, is likewise of conventional and well known form adapted to receive and photographically record the signals to produce seismograms of the signals. A variable resistor 16, in the form of a conventional double diode, is connected in shunt across the input of the amplifier on the amplifier side of resistor 13 by means of a lead 17, and to ground through condensers 25. The diodes of resistor 16 are connected in series, the plate of one diode being connected to the cathode of the other by means of a connection 19 which is connected to lead 17. The other plate and cathode are connected through respective leads 20 and 21 to condensers 25. A battery 23 and a resistor 24 are connected to each of the leads 20 and 21, forming sources of bias potential for each of the diodes. Each of the leads 20 and 21 is also connected, through condensers 25, to lead 18, thereby providing a low impedance path to ground for variable resistor 16. With this arrangement, it will be understood that the value of resistor 16 may be varied by varying the amount of bias applied to the diodes, and that the amount of signal-suppression applied to the signal to the amplifier will be proportional to the relative values of resistor 13 and variable resistor 16.

A pair of leads 26 tap the amplifier output leads 14 and 15, and are connected to the primary 27 of a transformer 28, having its secondary 29 suitably connected to the plates 30 of a conventional diode rectifier 31.

The cathode 32 of the rectifier is connected through a resistor 35 and lead 33 to the plate 40 of a triode 37. A second lead 34 connects the center point of transformer secondary 29, through a resistor 41, to the resistor 35. A condenser 36 is connected to plate 40 and resistor 35 as shown, and constitutes with the latter a filter effective to filter out the ripple component of the voltage supplied from rectifier 31.

The triode 37 is a conventional low Mu tube connected in shunt across leads 20 and 21 to control the amount of bias voltage applied to the diodes of the variable resistor 16. The triode 37 is connected in the so-called "inverted" manner with respect to tube 16. That is, its cathode 38 is connected to lead 21, its grid 39 is connected to lead 20, and its plate 40 is connected to lead 33. The plate 40 is biased negative, as shown, to the extent that the resistance between grid 39 and cathode 38 is high compared to resistor 24. Consequently, as the bias on plate 40 is reduced, the bias voltage to variable resistor 16 is more and more shunted to zero.

In the operation of my improved circuit, the plate 40 of tube 37 draws practically no current when biased negative, under which condition this tube has no effect or influence with respect to the function or operating action of condenser 36. For varying levels of operation, therefore, the time constants remain unaffected due to the isolation thus imposed between tube 16 and condenser 36. On account of such isolation, the respective values of resistor 35 and condenser 36 can be adjusted to obtain the desired time constants. These time constants remain unaffected regardless of occurring changes of the variable resistance 16 due to variations of signal intensity.

It will be seen, further, that in my improved automatic volume-control circuit, a portion of the output of amplifier 10 is indirectly applied to the diodes of variable resistor 16 to automatically control the gain in the amplifier in proportion to variations in the signal intensity. The conventional form of filter shown, and comprising resistor 35 and condenser 36, filters out the ripple component from rectifier 31, which otherwise would be present in the control voltage applied to the diodes of tube 16. The ideal values of resistor 35 and condenser 36 can be chosen to obtain the desired time-constants referred to commonly as the "operate time" and the "deoperate time," and to effect adequate filtering of the ripple component of rectified signal. However, these ideal values would ordinarily provide an operate time characteristic which is too slow to readjust the output signal for the first arrivals of a seismogram. To avoid this, a condenser 43 is connected in parallel with resistor 35. When the first arrivals of energy arrive at the amplifier 10, the signal is of such magnitude as to completely overload the amplifier, causing the output tube to deliver the maximum amount of power to rectifier 31. This condition exists only at the beginning, when the amplifier is at rest position and the automatic gain circuit is in its quiescent state. For the first arrival of energy, therefore, there is developed a transient rectified voltage having an extremely sharp wave front.

A separate adjustment of the operate time for the first arrivals may be had simply by choosing an appropriate value of condenser 43. At the same time, the operating effect of the filter is not materially affected.

In order to obtain the separate adjustment of the deoperate time, a separate path for current flow is provided by use of a resistor 44 and a diode 45 connected in series, this series being connected in parallel with resistor 35, as shown. In operation, during the quiescent state of amplifier 10, no potential exists across resistor 35. During the operate cycle, a potential is developed across resistor 35, by rectifier 31, until condenser 36 has become charged. This potential is of such sign that current will not flow through diode 45. Consequently, the operate characteristics are unaffected.

As for the deoperate cycle, the potential that had been developed by the rectifier has stopped, leaving condenser 36 charged, and the latter trying to discharge back through resistor 35 to assume its quiescent charge. Thus, the sign of the voltage developed across resistor 35 has suddenly reversed, and the diode 45 now will conduct, permitting current to also flow through resistor 44, thus placing the latter in parallel with resistor 35 during the discharge cycle.

Since it is desirable to cause the voltage across condenser 36 to change quite rapidly for the first arrivals only, this condenser has been chosen with the characteristic of being more responsive to sharp wave front or high frequencies, than to the lower frequency sine waves.

The value of condenser 36 can be relatively high as compared to the value of the condenser 43, and the value of resistor 35 can be relatively high as compared to the value of the resistor 44 connected to the plate of diode 45. Satisfactory results have been obtained using the respective values designated in the drawing.

As a further explanation of the improved operating action and capabilities in my improved volume-control circuit, it will be noted that plate 40 of tube 37 is provided with the negative bias by battery 42 having its positive terminal connected to ground, and its negative terminal connected, through the resistor 41 and resistor 35, to the plate 40 of tube 37. From the drawing, it will be seen that the control voltage developed by the signal through rectifier 31 is across resistor 41 and in opposition to battery 42. Therefore, when the potential across resistor 41 is equal to the voltage of battery 42, the potential of plate 40 has been reduced to zero with respect to ground. In such event, the elements 38 and 39 of tube 37 conduct, which in turn lowers the resistance of tube 16 to effect a corresponding readjustment of the output signal from amplifier 10.

It will be understood by those skilled in the art that various modifications in my improved circuit are possible without departing from the spirit of my invention or the scope of the claims.

I claim as my invention:

1. In a seismograph amplifying system, an automatic volume-control circuit, comprising, an amplifier, a variable resistor in the form of a thermionic tube connected in shunt across the input side of said amplifier, a source of bias potential for said tube, rectifier means supplied from the output side of said amplifier, a filter supplied from said rectifier means, and a second variable resistor in the form of a second thermionic tube supplied from said filter and connected to supply to said first-named tube bias potential in opposition to that from said source whereby the respective operate time and deoperate time of said amplifier remain substantially constant regardless of resistance variation of said first-named tube due to occurring variations in signal intensity from the output side of said amplifier.

2. In a seismograph amplifying system, an automatic volume-control circuit, comprising, an amplifier, a variable resistor in the form of a thermionic tube connected in shunt across the input side of said amplifier, a source of bias potential for said tube, rectifier means supplied from the output side of said amplifier, a filter supplied from said rectifier means, and a second variable resistor in the form of a triode tube supplied from said filter and connected in inverted manner to said first-named tube to supply thereto bias potential in opposition to that from said source.

3. In a seismograph amplifying system, the combination with an amplifier, a variable resistor in the form of a thermionic tube connected in shunt across the input side of said amplifier, a source of bias potential for said tube, rectifier means supplied from the output side of said amplifier, and a filter supplied from said rectifier means, of a second variable resistor in the form of a second thermionic tube supplied from said filter and connected to supply to said first-named tube bias potential in opposition to that from said source.

4. In a seismograph amplifying system, an automatic volume-control circuit, comprising, an amplifier, a variable resistor in the form of a thermionic tube connected in shunt across the input side of said amplifier, a source of bias potential for said tube, rectifier means supplied from the output side of said amplifier, a filter supplied from said rectifier means, and a second thermionic tube supplied from said filter and connected to change the operative characteristic of said first named tube for high ratio change of output signal from said amplifier.

5. In a seismograph amplifying system, an automatic volume-control circuit, comprising, an amplifier, a variable resistor in the form of a thermionic tube connected in shunt across the input side of said amplifier, a source of bias potential for said tube, rectifier means supplied from the output side of said amplifier, a filter supplied from said rectifier means and comprising a resistor and a condenser, and a second thermionic tube supplied from said filter and connected to isolate said condenser from said first-named tube whereby the respective operate-time and deoperate time of said amplifier remain substantially constant regardless of resistance variation of said first-named tube due to occurring variations in signal intensity from the output side of said amplifier.

6. In a seismograph amplifying system, an automatic volume-control circuit, comprising, an amplifier, a variable resistor in the form of a thermionic tube connected in shunt across the input side of said amplifier, a source of bias potential for said tube, rectifier means supplied from the output side of said amplifier, a filter supplied from said rectifier means and comprising a resistor and a condenser, a second thermionic tube supplied from said filter and connected to isolate said condenser from said first-named tube, and means providing a path for current flow separate from the path provided by said resistor whereby the deoperate time constant of said amplifier can be adjusted without substantially affecting the operate characteristics of said system.

7. In a seismograph amplifying system, an automatic volume-control circuit, comprising, an amplifier, a variable resistor in the form of a thermionic tube connected in shunt across the input side of said amplifier, a source of bias potential for said tube, rectifier means supplied from the output side of said amplifier, a filter supplied from said rectifier means and comprising a resistor and a condenser, a second thermionic tube supplied from said filter and connected to supply to said first-named tube bias potential in opposition to that from said source, and a second condenser connected in parallel relation with respect to said last named resistor and having a capacity relatively small as compared to the capacity of said first-named condenser.

8. In a seismograph amplifying system, an automatic volume-control circuit, comprising, an amplifier, a variable resistor in the form of a thermionic tube connected in shunt across the input side of said amplifier, a source of bias potential for said tube, rectifier means supplied from the output side of said amplifier, a filter supplied from said rectifier means and comprising a resistor and a condenser, a second thermionic tube supplied from said filter and connected to isolate said condenser from said first-named tube, and a resistor and a third thermionic tube series-connected and in parallel with said first-named resistor to provide a path for current flow separate from the path provided by said first-named resistor.

CHARLES E. HENDRICKS.

REFERENCES CITED

The following references are of record in the file of this patent:

UNITED STATES PATENTS

| Number | Name | Date |
|---|---|---|
| 2,156,846 | Getaz | May 2, 1939 |
| 2,164,939 | Pfister | July 4, 1939 |
| 2,250,559 | Weber | July 29, 1941 |
| 2,404,160 | Boucke | July 16, 1946 |